US012338725B2

(12) United States Patent
Koeneke et al.

(10) Patent No.: US 12,338,725 B2
(45) Date of Patent: Jun. 24, 2025

(54) SYSTEM TO MODEL DISTRIBUTED TORQUE, DRAG AND FRICTION ALONG A STRING

(71) Applicants: Joern Koeneke, Burgdorf (DE); Matthew Forshaw, Celle (DE); Thomas Dahl, Schwuelper (DE)

(72) Inventors: Joern Koeneke, Burgdorf (DE); Matthew Forshaw, Celle (DE); Thomas Dahl, Schwuelper (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 869 days.

(21) Appl. No.: 17/475,954

(22) Filed: Sep. 15, 2021

(65) Prior Publication Data

US 2022/0082008 A1 Mar. 17, 2022

Related U.S. Application Data

(60) Provisional application No. 63/079,213, filed on Sep. 16, 2020.

(51) Int. Cl.

| | |
|---|---|
| ***G06F 30/20*** | (2020.01) |
| ***E21B 23/14*** | (2006.01) |
| ***E21B 37/00*** | (2006.01) |
| ***E21B 47/00*** | (2012.01) |
| ***G08B 21/18*** | (2006.01) |

(52) U.S. Cl.
CPC .............. *E21B 47/00* (2013.01); *E21B 23/14* (2013.01); *E21B 37/00* (2013.01); *G08B 21/18* (2013.01); *E21B 2200/20* (2020.05)

(58) Field of Classification Search
CPC .......... E21B 47/00; E21B 23/14; E21B 37/00; E21B 2200/20; G08B 21/18
USPC .............................................................. 703/7
See application file for complete search history.

(56) References Cited

U.S. PATENT DOCUMENTS

| | | | |
|---|---|---|---|
| 4,760,735 | A | 8/1988 | Sheppard et al. |
| 4,848,144 | A | 7/1989 | Ho |
| 6,868,920 | B2 | 3/2005 | Hoteit et al. |
| 8,798,978 | B2 | 8/2014 | Ertas et al. |
| 9,435,187 | B2 | 9/2016 | Hohl et al. |

(Continued)

FOREIGN PATENT DOCUMENTS

| | | |
|---|---|---|
| WO | 2018058214 A1 | 4/2018 |
| WO | 2019119107 A1 | 6/2019 |

OTHER PUBLICATIONS

Corva; "The Evolution of Real-time Torque & Drag Analysis from Manual Local Usage to Automated Cloud-based Analytics"; SPE GCS Annual Drilling Symposium; Mar. 15, 2018; 22 Pages.

(Continued)

*Primary Examiner* — Andre Pierre Louis
(74) *Attorney, Agent, or Firm* — CANTOR COLBURN LLP

(57) ABSTRACT

A method and apparatus for performing an operation in a wellbore penetrating the earth's formation. The apparatus includes a string and a first processor. The string is disposed in the wellbore. The first processor determines, by using a first friction test at a first friction test time, a first friction parameter between a first selected subregion and the wellbore and a second friction parameter between a second selected subregion and the wellbore.

16 Claims, 12 Drawing Sheets

(56) References Cited

U.S. PATENT DOCUMENTS

| | | | | |
|---|---|---|---|---|
| 2009/0216453 | A1 * | 8/2009 | Zaeper | E21B 47/09 702/6 |
| 2014/0196949 | A1 | 7/2014 | Hareland et al. | |
| 2016/0348493 | A1 | 12/2016 | Hohl | |
| 2019/0178059 | A1 * | 6/2019 | Zheng | E21B 47/00 |
| 2020/0173268 | A1 | 6/2020 | Zhang, Jr. et al. | |

OTHER PUBLICATIONS

Fazaelizadeh; "Real Time Torque and Drag Analysis During Directional Drilling"; University of Calgary; Mar. 2013; 200 Pages.
International Search Report and Written Opinion Issued in International Application No. PCT/US2021/050243 Mailed Dec. 21, 2021; 7 Pages.
Ruiz; "Pediction Technique"; Pegasus Vertex, Inc.—Blog; Breakroom for Drilling Professionals; Feb. 24, 2015; 20 Pages.

* cited by examiner

SYSTEM TO MODEL DISTRIBUTED TORQUE, DRAG AND FRICTION ALONG A STRING

CROSS-REFERENCE TO RELATED APPLICATIONS

This application claims the benefit of U.S. Application Ser. No. 63/079,213, filed on Sep. 16, 2020, the contents of which are incorporated by reference herein in their entirety.

BACKGROUND

In the resource recovery industry, a string is used to drill a wellbore in a formation. During drilling operations, the string can come into contact with the wall of the wellbore, causing side forces, friction and, in severe situations, a stuck string. These side forces and friction are due to axial motion of the string, string rotation and drag on the string. Side forces and friction can cause severe damage and wear on the string and may even lead to lost strings. It is therefore desirable to be able to determine frictional forces between the string and the wellbore.

SUMMARY

In an aspect, a method of performing an operation in a wellbore penetrating the earth's formation is disclosed. A string is disposed in the wellbore. A first subregion of the string and a second subregion of the string are selected. Using a first friction test at a first friction test time, a first friction parameter between the first subregion and the wellbore and a second friction parameter between the second subregion and the wellbore are determined. The operation is performed based on the first friction parameter and the second friction parameter.

In another aspect, an apparatus for performing an operation in a wellbore penetrating the earth's formation is disclosed. The apparatus includes a string and a first processor. The string is disposed in the wellbore. The first processor is configured to determine, by a first friction test at a first friction test time, a first friction parameter between a first selected subregion and the wellbore and a second friction parameter between a second selected subregion and the wellbore.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
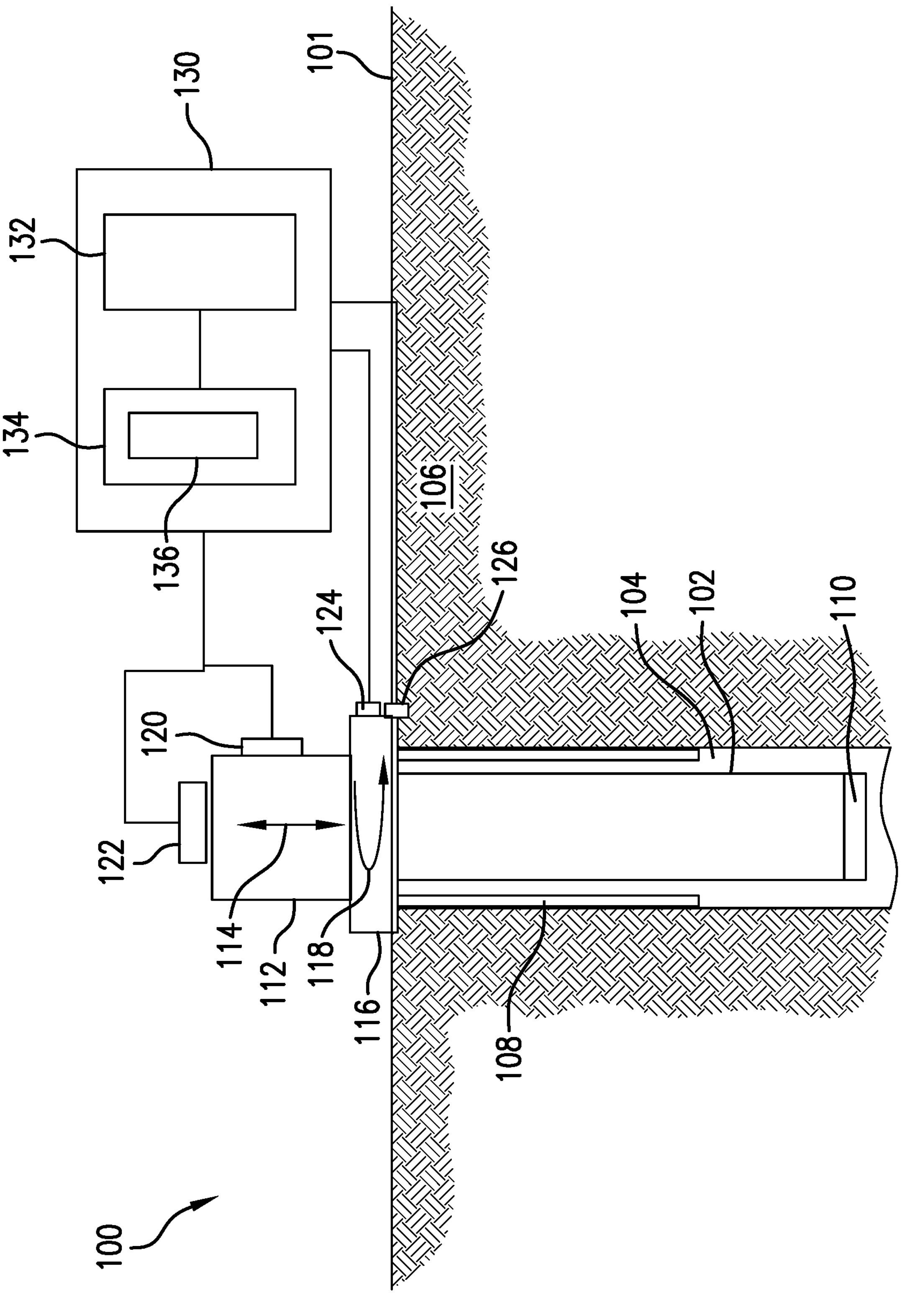
FIG. 1 shows a drilling system in an embodiment.

Referring to FIG. 1, a wellbore system 100 is shown. The wellbore system 100 includes a string 102 disposed in a wellbore 104 in a formation 106. In various embodiments, the string 102 can be a casing, a liner, a completion string, a workover string, a drill string, etc. In various embodiments, the string 102 comprises a number of pipes that are fixedly connected. The wellbore 104 can be vertical wellbore, as shown in FIG. 1. Alternatively, the wellbore 104 can also have a deviated section with an inclination angle larger than zero degree up to a horizontal section with an inclination angle of 90 degree. The wellbore 104 can have a riser, conductor, casing and/or liner 108 extending over at least a portion of the wellbore 104, referred to herein as a cased or lined region. The wellbore 104 can also have an uncased and unlined region below the cased region (also known as open hole). The string 102 extends into the wellbore 104 from a surface location 101. The string 102 can have an end piece 110 at a bottom end thereof, which can be a drill bit, a casing shoe, a bull nose, a mill, etc. A drill string can include a bottom hole assembly (BHA) at its lower end close to the end piece 110, such as the drill bit. The BHA is connected to surface equipment through a drill string comprising threaded drill pipes. The BHA may include at least one downhole measurement device or tool that is used to measure a parameter of interest downhole. The parameter of interest may be a formation parameter of the surrounding earth formation (Formation Evaluation), a parameter of the wellbore and the drilling fluid in the wellbore, or a drilling parameter. The downhole measurement device may be a resistivity tool, a gamma ray tool, a nuclear tool, an acoustic tool, a nuclear magnetic resonance tool, or a sampling tool. The downhole measurement device may measure downhole temperature, downhole pressure, orientation of the downhole string (inclination, azimuth), and a drill string dynamics parameter, such as lateral, torsional, axial acceleration, bending moment, downhole rotation (revolution per minute (RPM)), and downhole weight on bit (WOB). The BHA may include a downhole motor, such as a mud motor. Additionally, or alternatively, the BHA may include a steering device, such as a downhole motor including a tilt (e.g., an adjustable kick off (AKO)) or a rotary steerable system (RSS). The BHA may further include a telemetry device capable of communicating data to the surface or receiving instructions and drilling or measurement parameter from the surface. Telemetry includes a mud pulse telemetry, electromagnetic telemetry, acoustic telemetry, and wired pipe telemetry. The BHA includes a power generation tool such a downhole generator including a turbine, driven by downhole fluid (mud flow) or a downhole battery. The BHA may include a reaming tool to ream selected sections of the wellbore to remove cuttings, provide for sufficient hole cleaning, and minimize a probability of development of potential pipe sticking points. The BHA may include at least one processing device and at least one memory device to process and store data downhole and control a drilling operation downhole.

The wellbore system 100 includes one or more force application devices for moving the string 102 either axially, rotationally, or a combination of axially and rotationally. An axial force device 112 at the surface location 101 applies an axial force (as indicated by axial arrow 114) on the string 102 in order to drive the string 102 into the wellbore 104 for drilling. The axial force device 112 can also be used to retrieve the string 102 to the surface location 101 or raise the string 102 within the wellbore 104. A rotary device 116 such as a rotary table, top drive, etc. applies a torque (as indicated by rotational arrow 118) on the string 102 in order to produce a rotation of the string 102. Friction between the string 102 and a wall of the wellbore 104 and/or the casing or liner 108 resists both axial and rotational movement of the string 102 in the wellbore 104.

The wellbore system 100 also includes various sensors for measurement process variables of the wellbore system 100. A displacement sensor 120 is sensitive to displacement or displacement velocity of at least portions of the string 102 due to operation of the axial force device 112. A force sensor 122 is sensitive to the axial force applied by axial force device 112. The force sensor 122 may be a load sensor that is sensitive to the load at the hook (not shown) carrying the string 102 (also known as hookload) due to operation of the axial force device 112. Torque sensor 124 measures a torque on at least a portion of the string 102 due to operation of the rotary device 116. Rotation sensor 126 measures rotational displacement and/or rotational velocity of the string 102 due to operation of the rotary device 116. In another embodiment, the string 102 is a drill string that contains downhole measurement devices (downhole sensors) for measuring the downhole process variables in addition or instead of the surface measurement devices.

The wellbore system 100 also includes a control unit 130 for controlling various operations of the wellbore system 100. Control unit 130 includes a processor 132 and a computer-readable storage medium 134, which can be a solid-state storage medium in various embodiments. The computer-readable storage medium 134 includes programs or instructions 136 stored thereon that, when accessed by the processor 132, enable the processor 132 to perform the various operations disclosed herein. In various embodiment, the control unit 130 can include a single processor or a plurality of processors, such as a cloud computer, edge device, Internet of Things (IoT) device or other IR 4.0 technology devices. In one embodiment, the processor 132 controls an operation of the axial force device 112 and the rotary device 116 to apply selected axial forces and torques, respectively, on the string 102 and also obtains measurements of resulting parameters of motion, such as, but not limited to, string displacement (axial and/or rotational) and velocity (axial and/or rotational), and force (e.g., hookload), and torque on the string from the appropriate sensors. The processor 132 further processes these measurements in order to determine a distribution of one or more friction parameters (including friction coefficients) along a length of the string, as disclosed herein. The processor 132 uses the friction parameters in a string model in order to determine friction between the string and the wall of the wellbore along a length of the string and to locate depths of high friction between string 102 and wall of wellbore 104 (e.g., friction force beyond a preselected threshold or frictional sticking points). The processor 132 further estimates the parameters and estimated states using a model, as discussed herein. In various embodiments, the processor 132 can be a plurality of processors, such as a first processor, a second processor and a third processor.

Figure 2:
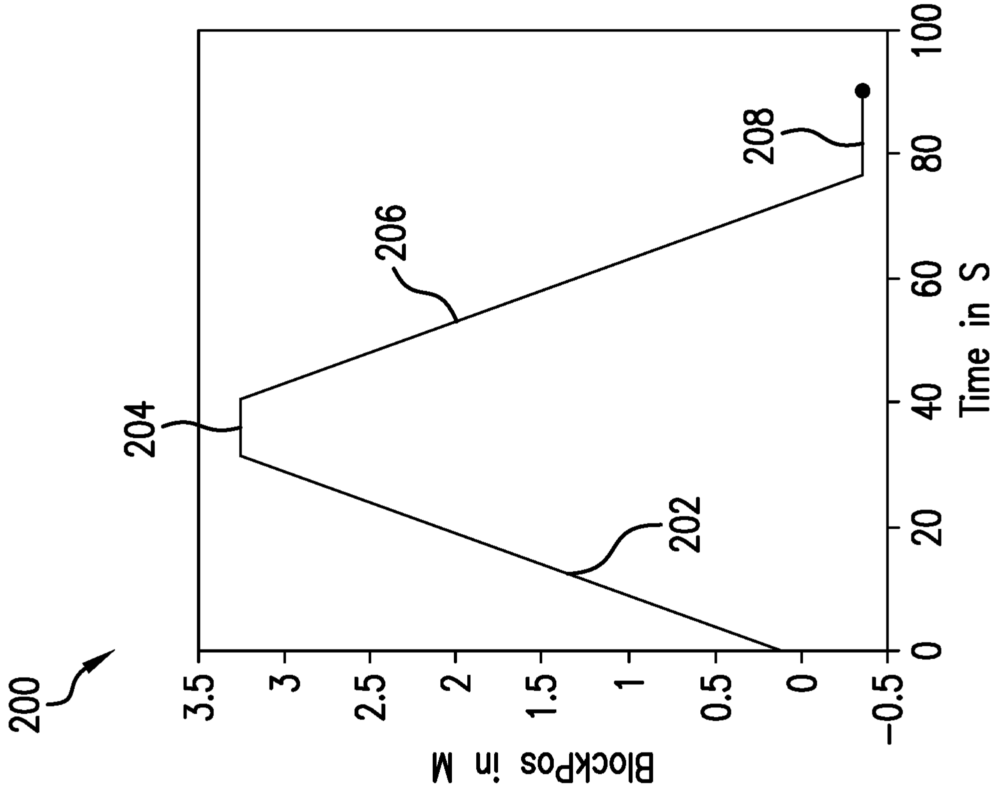
FIG. 2 shows a graph of an axial displacement of the string over a selected time period due to operation of the axial force device.

FIG. 2 shows an illustrative graph 200 of an axial displacement of the string 102 over a selected time period due to operation of the axial force device 112. In the example of FIG. 2, the relative position of the block (also known as a traveler block) is shown that is connected to the hook, which in turn is connected to the string 102. Time is shown along the abscissa in seconds, and position or axial displacement of the block is shown along the ordinate axis in meters. It is to be understood that the times and distances used herein to describe the graph 200 are provided only for explanatory purposes and are not meant to be a limitation on the invention. Typically, the displacement of the block position is relatively small, i.e., smaller than three or two pipes (usually called a stand) or even smaller than a single pipe. Keeping the displacement of the block position on the string relatively small helps to save time that would be needed to screw and unscrew pipes if the displacement of the selected position on the string would be larger. From time t=0 seconds to about t=30 seconds, the axial force device 112 raises the string 102 upward (out of the wellbore) linearly from about 0 meters to about 3.25 meters indicated by graph segment 202. From t=30 seconds to t=40 seconds, the string remains stationary at about 3.25 meters indicated by graph segment 204. From t=40 seconds to about t=75 seconds, the axial force device 112 lowers the string 102 downward (into the wellbore) linearly from about 3.25 meters to about −0.3 meters indicated by graph segment 206. From t=75 seconds onwards the string remains stationary at about −0.3 meters indicated by graph segment 208.

Figure 3:
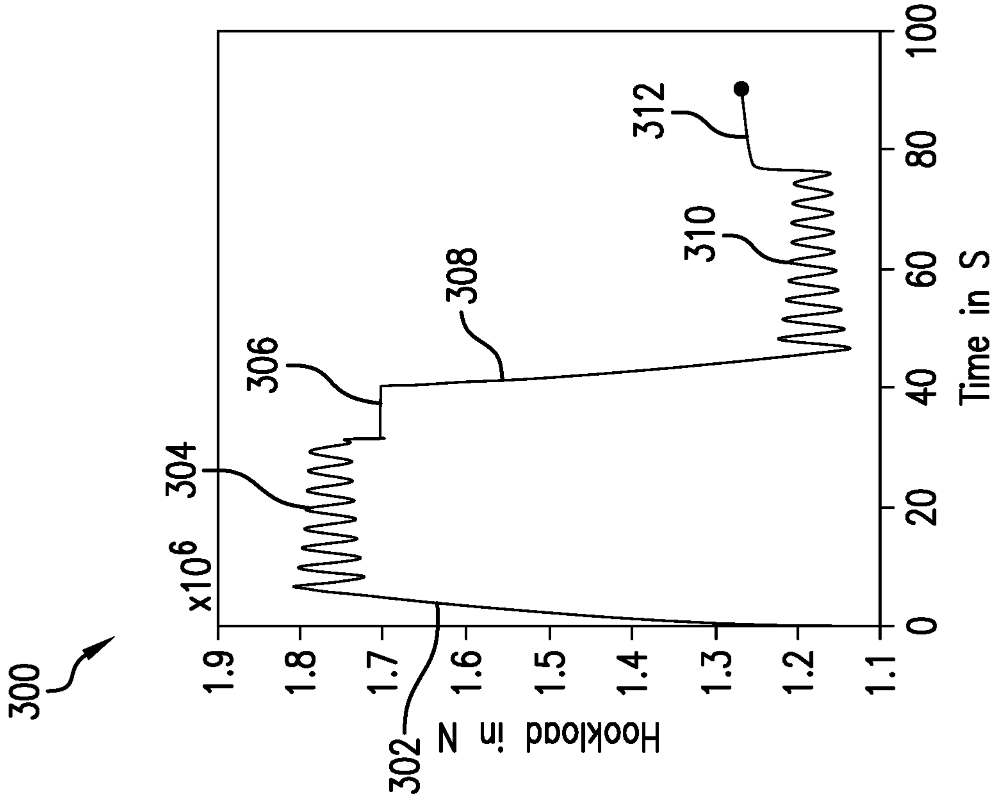
FIG. 3 shows a graph of hookload on the string in conjunction with the axial displacement shown in FIG. 2.

FIG. 3 shows an illustrative graph 300 of force or load on the hook that is connected to the traveler block and the string 102 (also known as hookload) on the string 102 in response to the axial displacement shown in FIG. 2. Time is shown along the abscissa in seconds, and hookload is shown along the ordinate axis in Meganewtons (MN). It is to be understood that the times and distances used herein to describe the graph 300 are provided only for explanatory purposes and are not meant to be a limitation on the invention. From time t=0 seconds to about t=5 seconds, the force increases from about 1.25 MN to about 1.8 MN indicated by graph segment 302. From about t=5 seconds to about t=30 seconds, transient oscillations in the hookload occur around an average hookload of about 1.75 MN, as indicated by graph segment 304. The transient oscillations in graph segment 304 are centered about a mean value indicating a mean dynamic force applied along the string, which can be used to determine a coefficient of dynamic friction between the string 102 and the wellbore 104. From about t=30 seconds to about t=40 seconds, the hookload settles at about 1.7 MN, as indicated by graph segment 306. From time t=40 seconds to about t=45 seconds, the force decreases from about 1.7 MN to about 1.15 MN indicated by graph segment 308. From about t=45 seconds to about t=75 seconds, transient oscillations in the hookload occur around an average hookload of about 1.15 MN, as indicated by graph segment 310. From about t=75 seconds onwards, the hookload settles at about 1.25 MN, as indicated by graph segment 312. Measurements shown in graphs 200 and 300 were acquired at the same time, i.e., the abscissa is identical for both graphs. Accordingly, block positions indicated by graph segments 202 occurred at the same time as hookloads indicated by graph segments 302 and 304, block positions indicated by graph segment 204 occurred at the same time as hookloads indicated by graph segment 306, block positions indicated by graph segment 206 occurred at the same time as hookloads indicated by graph segments 308 and 310, and block positions indicated by graph segment 208 occurred at the same time as hookloads indicated by graph segment 312. Consequently, the graph segments 202, 204, 206, and 208 correspond to the respective hookload values in graph segments 302/304, 306, 308/310, and 312, and vice versa. Accordingly, the various movements indicated by graph 200 occur in conjunction with the corresponding hookloads shown in graph 300. Those skilled in the art will appreciate that from friction tests like the one described with respect to FIGS. 2 and 3, friction coefficients or other friction parameters can be derived to describe a relationship between displacement data (such as axial displacement data (e.g., axial displacement or axial velocity) or rotational displacement data (e.g., rotational displacement or rotational velocity)) and dynamic data (such as axial dynamic data (e.g., axial force or load, such as hookload, or acceleration) or rotational dynamic data (e.g., rotational moment, such as torque, or rotational acceleration)). In case of a linear relationship between displacement data and dynamic data, the friction coefficient is a friction factor which may be independent from the displacement data and the dynamic data for at least a portion of the range of the dynamic and/or displacement data.

Figure 4:
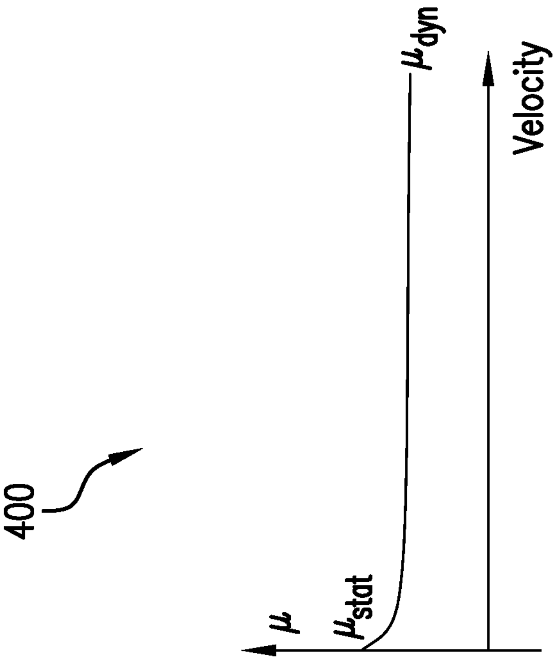
FIG. 4 shows a graph illustrating a relation between coefficient of friction and relative velocity between parts in frictional contact.

FIG. 4 shows an illustrative graph 400 showing a relation between coefficient of friction and relative velocity between parts in frictional contact such as a wall of wellbore 104 and string 102. A coefficient of static friction $\mu_{sat}$ is used to describe the friction between the string 102 and the wellbore 104 in a motionless state. A coefficient of dynamic friction $\mu_{dyn}$ is used to describe the friction between string 102 and the wellbore 104 in a state with a high non-zero relative velocity between string 102 and wellbore 104. The coefficient of dynamic friction $\mu_{dyn}$ is less than the coefficient of static friction. FIG. 4 also displays a dependence coefficient of friction on relative velocity for low velocities. At high velocities, the coefficient of dynamic friction $\mu_{dyn}$ is constant with respect to the relative velocity.

Figure 5:
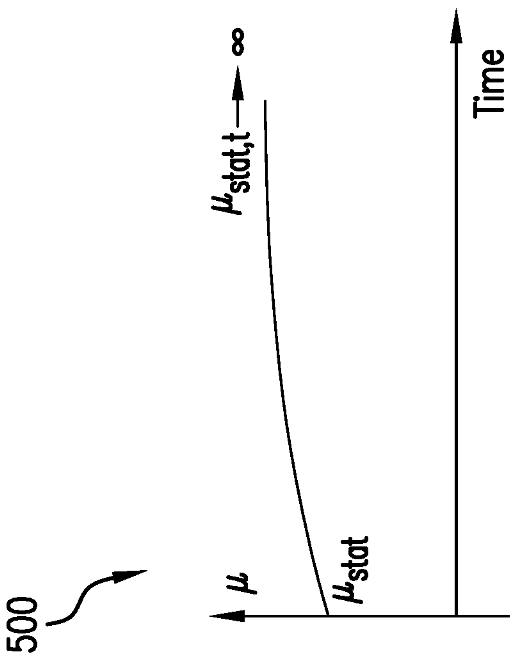
FIG. 5 shows a graph illustrating a relation between the coefficient of static friction and time.

FIG. 5 shows a graph 500 illustrating a relation between the coefficient of static friction and time. In general, the term "coefficient of static friction" depends on time. The coefficient of static friction tends to increase with time as elements being stuck together, for example, by cuttings accumulation or filter cake growth. The coefficient of static friction converges asymptotically to a value at t=+infinity, indicated herein as the coefficient of static friction at infinity (infinite time) or $\mu_{stat,\ t\rightarrow inf}$.

Figure 6:
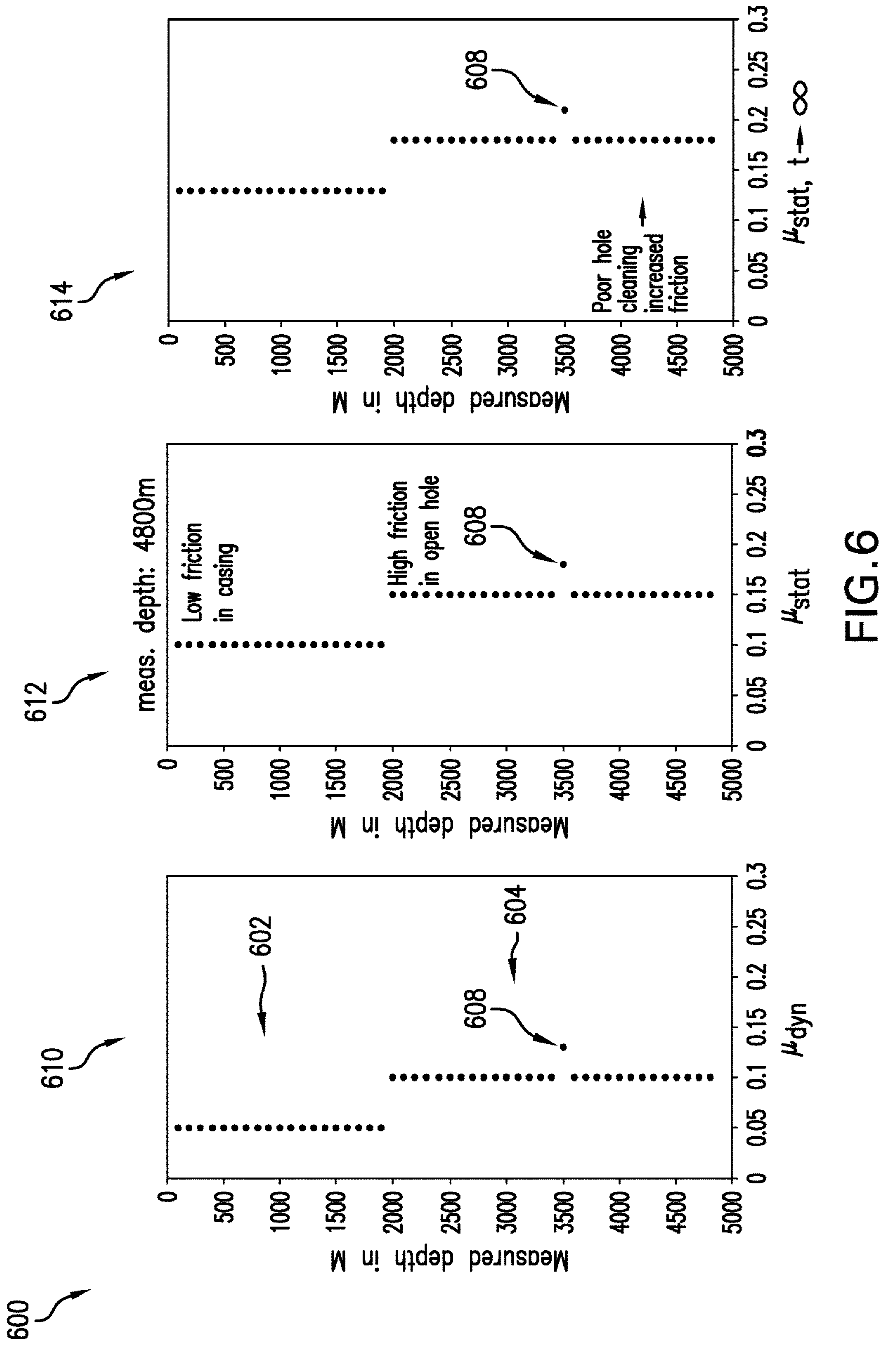
FIG. 6 shows three graphs illustrating a relation between friction coefficients with depth between a string and a wellbore determined using the methods disclosed herein.

FIG. 6 shows three graphs 600 illustrating a relation between friction coefficients with measured depth between a string 102 and a wellbore 104 determined using the methods disclosed herein. The measured depth as defined and used within this application is the distance along the wellbore from a reference point at or near the surface. For example, the measured depth of a drill bit is the distance along the wellbore from a reference point at or near the surface to the drill bit. For vertical wellbores, the measured depth equals the so-called true vertical depth (which is the distance to a virtual plane that includes the reference point and is parallel to the earth's surface). However, for deviated wellbores, measured depth and true vertical depth are different. In one embodiment, the first graph 610 can be derived by using dynamic and displacement data (e.g., from friction tests as described with respect to FIGS. 2 and 3) in combination with system identification methods as described below. To derive graphs 610, 612, and 614, the string is divided in two or more subregions having corresponding length intervals with each subregion having a friction coefficient. The two or more subregions may be of different lengths or may have the same length. The length intervals may be 1000 in or smaller, for example 500 m or smaller. The smaller the length intervals are, the more detailed are the derived friction coefficients. On the other hand, the smaller the length intervals are, the more length intervals are needed and consequently the more data needs to be provided by the friction tests of FIGS. 2 and 3 to allow solution for friction coefficients of all length intervals. However, a typical friction test allows length intervals of 300 m or smaller, or even 100 m or smaller (such as those used to create FIG. 6), such as 30 m or smaller. The subregions may correspond to components of the string, like pipes or subcomponents of the BHA. Friction coefficients in different subregions may be equal or different. The wellbore 104 includes a cased or lined region 602 from 0 meters to a measured depth of 2000 meters and an uncased and unlined region 604 from a measured depth of 2000 meters to a measured depth of 5000 meters. A first graph 610 shows a coefficient of dynamic friction $\mu_{dyn}$ between the string and the wellbore wall along a length of the string 102. The coefficient of dynamic friction is lower in the cased or lined region 602 (due to metal-metal contact between string and casing/liner) than in the uncased and unlined region 604 (due to metal-rock contact in the open hole region). In the example of FIG. 6, over the length of the cased or lined region 602, $\mu_{dyn}$=0.05 and in the uncased and unlined region 604, $\mu_{dyn}$=0.1. A discontinuity in $\mu_{dyn}$ at a measured depth of 3500 meters indicates an increase in the coefficient of dynamic friction, for example due to poor wellbore cleaning, differential sticking, or mechanical sticking. Differential sticking can be due to a differential pressure between the wellbore 104 and the formation 106. For example, in conditions where a relatively high pressurized wellbore penetrates a formation with relatively low formation pressure, a differential force is created that causes a differential force acting on a contact area of the string. When the contact area is large enough, the differential force can be high enough so that the string becomes stuck. Mechanical sticking can be due to, for example, hole pack off, formation and string geometry, settled cuttings, key seating, shale instability, mobile formations, fractured rocks, an undergauged hole, cement blocks, micro doglegs and ledges, junk in the wellbore, etc.

A second graph 612 shows a coefficient of static friction $\mu_{stat}$ along a length of the string. In one embodiment, the second graph 612 can be determined from the first graph 610 using the relation shown in FIG. 4. In another embodiment, the second graph 612 can be derived by using dynamic and displacement data (e.g., from a friction test as described with respect to FIGS. 2 and 3) in combination with system identification methods as described below. The coefficient of static friction is lower in the cased or lined region 602 than in the uncased and unlined region 604. Over the length of the cased or lined region, $\mu_{stat}$=0.1 and in the uncased and unlined region, $\mu_{stat}$=0.15. A discontinuity in $\mu_{stat}$ at a measured depth of 3500 meters indicates an increase in the coefficient of static friction due to poor wellbore cleaning or other wellbore issues.

A third graph 614 shows a coefficient of static friction at infinity $\mu_{stat,\ t\rightarrow inf}$ along a length of the string. In one embodiment, the second graph 612 can be determined from the first graph 610 using the relation shown in FIG. 5. In another embodiment, the third graph 614 can be derived by using dynamic and displacement data (e.g., from a friction test as described with respect to FIGS. 2 and 3) in combination with system identification methods as described below. The coefficient of static friction at infinity is lower in the cased or lined region 602 than in the uncased and unlined region 604. Over the length of the cased or lined region, $\mu_{stat,\ t\rightarrow inf}$=0.13 and in the uncased and unlined region, $\mu_{stat,\ t\rightarrow inf}$=0.18. A discontinuity in $\mu_{stat,\ t\rightarrow inf}$ at a measured depth of 3500 meters indicates an increase in the coefficient of static friction at infinity due to a poor wellbore cleaning or other wellbore issues.

In graphs 610, 612, and 614, each symbol represents a friction coefficient of a subregion of string 102 that is located within a length interval of string 102 and has the corresponding measured depth value. Notably, as outlined and described below, all friction coefficients in graphs 610, 612, and 614 were calculated from one single friction test, for example, the single friction test that is described with respect to FIGS. 2 and 3. That is, all symbols in graphs 610, 612, and 614 representing friction coefficients of specific subregions of string 102 with corresponding length intervals were determined while these subregions were downhole. For example, all symbols in graphs 610, 612, and 614, representing friction coefficients of specific subregions of string 102 were determined while the end piece 110 (e.g., the drill bit) is within a measured depth interval that is smaller than 30 meters, 20 meters or even 10 meters. Alternatively, all symbols in graphs 610, 612, and 614, representing friction coefficients of specific subregions of string 102 were determined while the end piece 110 (e.g., the drill bit) was within a measured depth interval that is smaller than the length of three pipes, two pipes, or even one pipe. Similarly, all symbols in graphs 610, 612, and 614, representing friction coefficients of specific subregions of string 102 were determined without adding or removing pipes to or from string 102. In the example of FIG. 6, all symbols in graphs 610, 612, and 614, representing friction coefficients of specific subregions of string 102 were determined while the end piece 110 (e.g., the drill bit) is at a measured depth of 4800 meters±30 meters.

Figure 9:
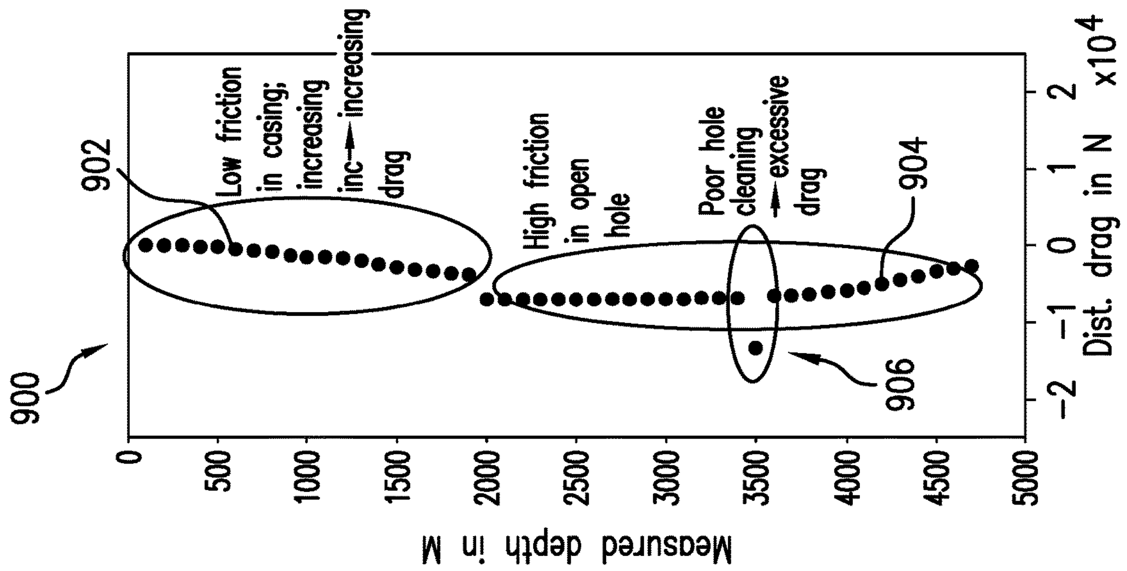
FIG. 9 shows a graph illustrating a distribution of drag along the string.
Figure 8:
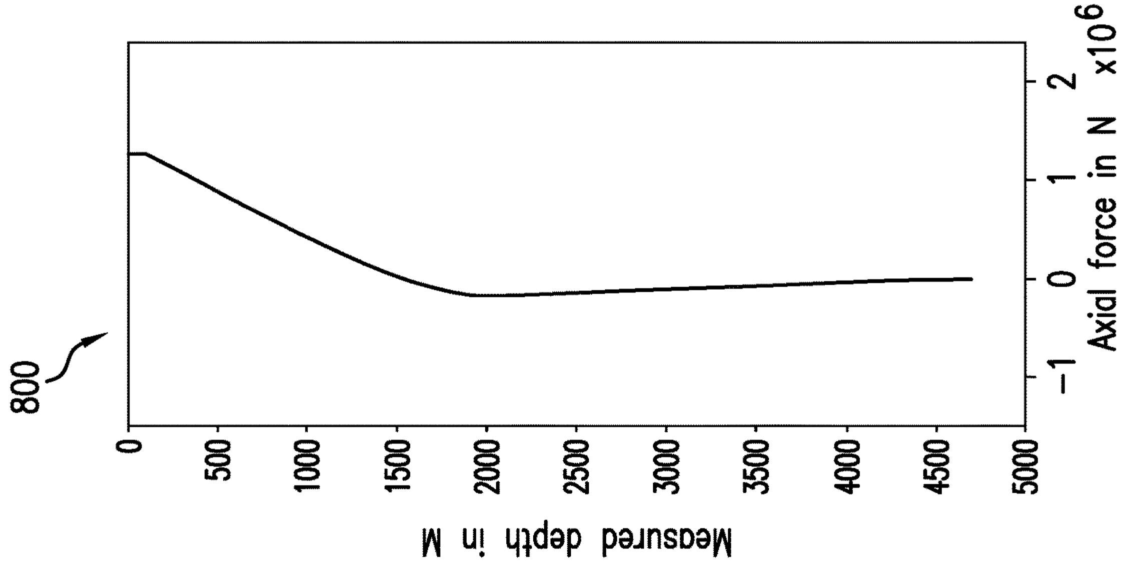
FIG. 8 shows a graph illustrating axial force along the string.
Figure 7:
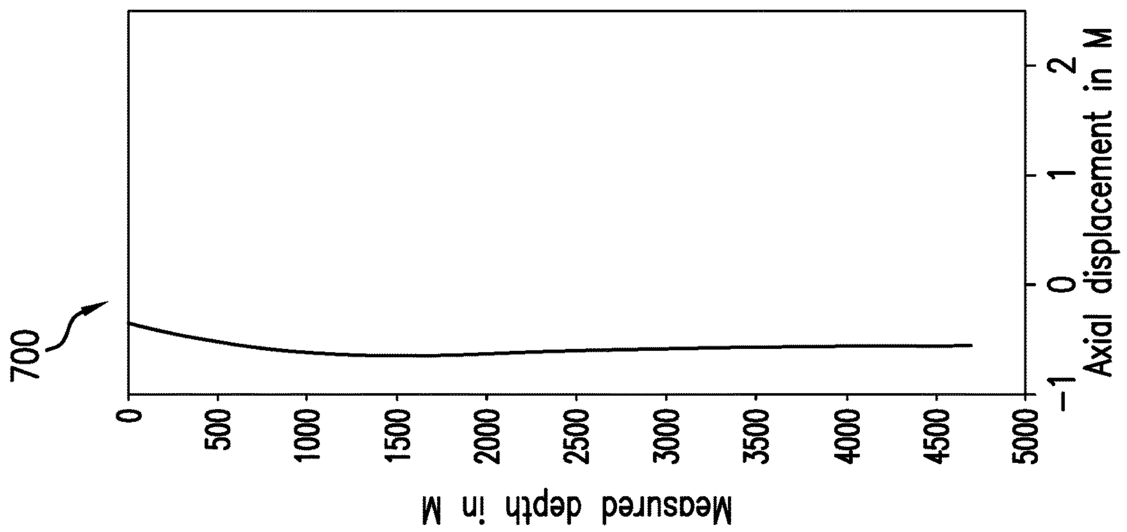
FIG. 7 shows a graph illustrating axial displacement along the string in response to an axial force.

FIGS. 7, 8 and 9 show values of other friction parameters such as values of axial displacement, axial force, and distributed drag, respectively, that are calculated by methods known in the art (e.g., by torque and drag models using the friction coefficient distributions as shown in FIG. 6). In the context of this application, friction parameters include friction coefficients as described with respect to FIGS. 4-6 as well as other friction related parameter that may be related to the friction coefficients like those shown in FIGS. 7-9. FIG. 7 shows a graph 700 illustrating axial displacement along the length of string 102 (or measured depth) in response to an axial force that is applied at one location of the string, for example at measured depth=0 meters as shown in FIG. 7. The axial displacement along the string may be determined by using the friction parameters for the various subregions of string 102 along the string 102 (e.g., such as friction coefficients of subregions with corresponding length intervals along the string as shown in FIG. 6) in a string system model, such as a torque and drag model. The torque and drag model includes various parameters that are inherent to the string and wellbore, such as a mass of the string and/or string components, geometry of the string and/or string components, elasticity of the string, wellbore geometry, etc. The torque and drag model, which may be a finite element model or a finite differences model, includes various unknown parameters (e.g., friction coefficients or other friction parameters) as well as unknown states (e.g., axial/torsional displacement, velocity, acceleration) for multiple elements (e.g., pixels, voxels, cells, length intervals, etc.) depending on the number of elements of the torque and drag model. The friction parameters and states of the torque and drag model are estimated using dynamic and displacement data (e.g., from a friction test as described with respect to FIGS. 2-6) in combination with system identification methods as described below. The friction parameter is derived predominantly from a combination of load measurements and physics-based modeling. Alternatively, the friction can be derived from direct downhole measurements of load at two or more discrete points in the wellbore. Once the friction parameter is determined, it can be input into the torque and drag model in order to calculate a frictional force between the string and wellbore. The friction parameters shown in FIGS. 7-9 can also be directly estimated, for example by from friction tests as described with respect to FIGS. 2 and 3 in combination with system identification methods as described below. The frictional force can be an axial friction on the string or rotational friction on the string, for example. In the example of FIG. 7, the axial displacement is substantially constant below a measured depth of about 2000 meters associated with the axial displacement as shown in FIG. 7 and increases from 2000 meters to the surface.

FIG. 8 shows a graph 800 illustrating axial force along the string associated with the axial displacement as shown in FIG. 7. The axial force can be directly estimated or can be determined from the torque and drag model using the friction coefficients obtained via the methods described herein. In the example of FIG. 8, the axial force is substantially constant below a measured depth of about 2000 meters and increases from 2000 meters to the surface.

FIG. 9 shows a graph 900 illustrating a distribution of drag for each length interval along the string, which is the dynamic friction force corresponding to $\mu_{dyn}$. The drag can be determined from the torque and drag model using the friction parameter obtained via the methods described herein. FIG. 9 illustrates a low drag 902 along the casing/liner or in the cased or lined region (i.e., from 0 meters to 2000 meters). There is high drag 904 in an open wellbore or uncased/unlined region of the wellbore (below 2000 meters). A discontinuity 906 in the drag occurs at a measured depth of about 3500 meters, indicating excessive drag at that measured depth due to poor wellbore cleaning, etc.

Figure 10:
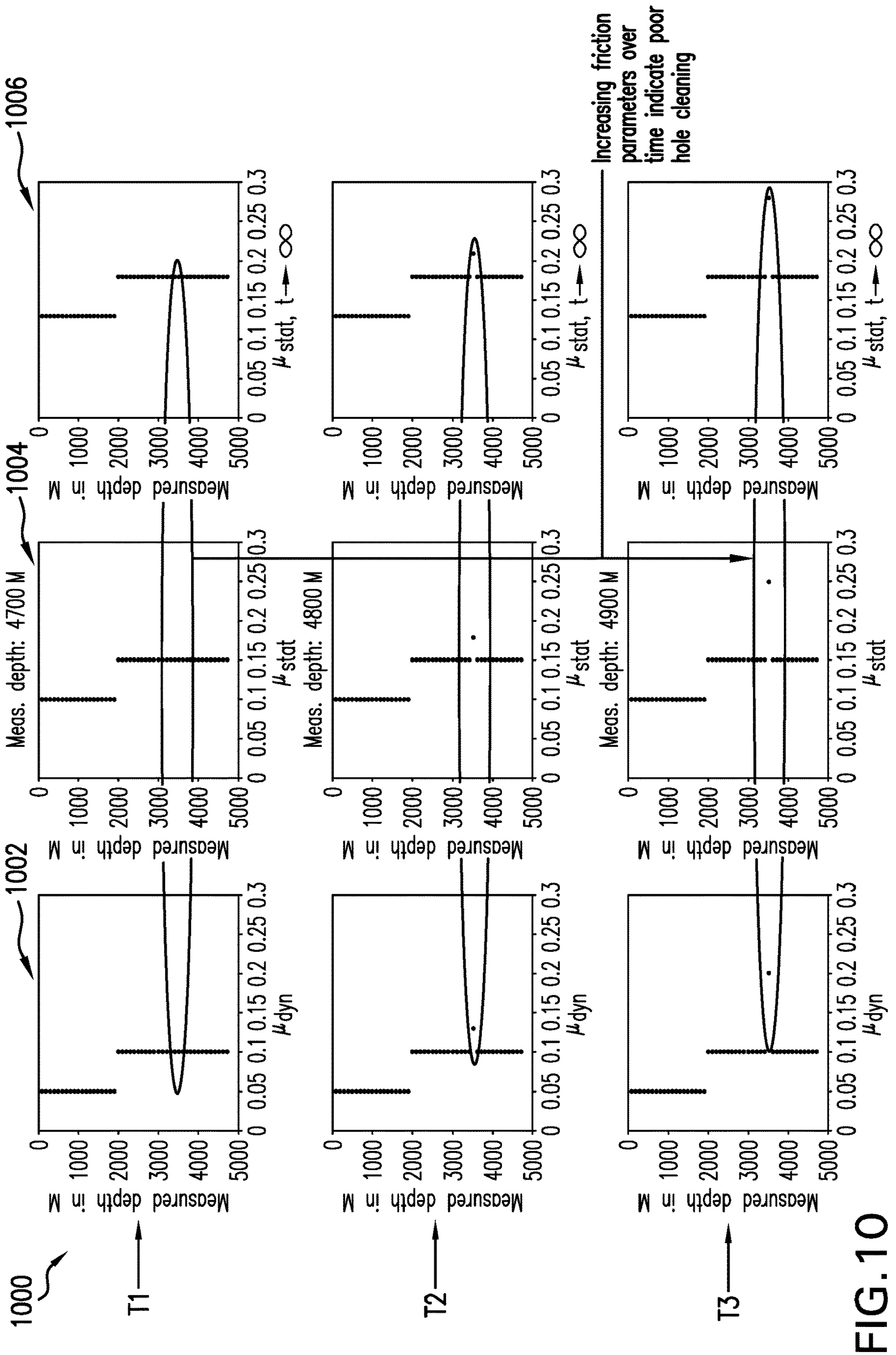
FIG. 10 shows various graphs illustrating an exemplary evolution of friction parameters along the length of the wellbore over time.

FIG. 10 shows various graphs 1000 illustrating friction coefficients along the length of the wellbore at different times. The graphs of column 1002 illustrate an evolution of the dynamic friction coefficient over time. The graphs of column 1004 illustrate an evolution of the static friction coefficient over time. The graphs of column 1006 illustrate an evolution of the coefficient of static friction at infinity over time. T1, T2, and T3 indicate the times when a friction test was done as shown and described with respect to FIGS. 2-6. That is, a first friction test was done at T1 when end piece 110 of string 102 was at a measured depth of 4700 meters, a second friction test was done at T2 when end piece 110 was at a measured depth of 4800 meters, and a third friction test was done at T3 when end piece 110 was at a measured depth of 4900 meters. From the first friction test, $\mu_{dyn}$, $\mu_{stat}$, and $\mu_{stat,t\rightarrow infinity}$ for time T1 in respective graphs of columns 1002, 1004, and 1006 were determined for each subregion (length interval) of string 102. After the calculation of the values shown in graphs of columns 1002, 1004, and 1006 for time T1, string 102 was moved to a second measured depth of 4800 meters (i.e., pipes may have been added to string 102 to elongate and lower down string 102) and the second friction test at time T2 was done. The string is then divided again in two or more subregions having corresponding length intervals with each subregion having a friction parameter as described with respect to FIG. 6. The length intervals for the friction test at time T2 may be the same as or different from the length intervals that were used for the friction test at time T1. From the second friction test, $\mu_{dyn}$, $\mu_{stat}$, and $\mu_{stat,t\rightarrow infinity}$ for time T2 in respective graphs of columns 1002, 1004, and 1006 were determined again for each subregion (length interval) of string 102. After the calculation of the values shown in graphs of columns 1002, 1004, and 1006 for time T2, string 102 was moved to a third measured depth of 4900 meters and the third friction test at time T3 was done. The string is then divided again in two or more subregions having corresponding length intervals with each subregion having a friction parameter as described with respect to FIG. 6. The length intervals for the friction test at time T3 may be the same as or different from the length intervals that were used for the friction test at times T1 and/or T2. From the third friction test, $\mu_{dyn}$, $\mu_{stat}$, and $\mu_{stat,t\rightarrow infinity}$ for time T3 in respective graphs of columns 1002, 1004, and 1006 were determined again for each subregion (length interval) of string 102. The subregions (length intervals) that were used to determine the friction coefficients at time T1 may be identical to or different from the subregions (length intervals) that were used to determine the friction coefficients at time T2 and/or T3. Time is shown as increasing down the page, with T1<T2<T3.

At T1, these friction parameters display a constant value in the cased or lined region between 0 meters and 2000 meters and another constant value in the uncased and unlined region between 2000 meters and 4800 meters with a discontinuity at the measured depth of an interface between the cased or lined region and uncased and unlined region. At T2, an additional discontinuity appears at a measured depth of about 3500 meters in each of the coefficient of dynamic friction, coefficient of static friction and coefficient of static friction at infinity. Notably, the discontinuity at a measured depth of about 3500 meters can be identified by the comparison of friction parameters of different subregions that have length intervals that partially or temporary overlap with the same measured depth interval of the wellbore at the friction test times T1 and T2. For example, a first subregion of the string with a first length interval partially or temporary overlapping a particular measured depth interval at time T1 reveals a first set of friction parameters and a second subregion of the string with a second length interval partially or temporary overlapping the same particular measured depth interval at time T2 reveals a second set of friction parameters that are higher than the friction parameters of the first set of friction parameters. The additional discontinuity within that particular measured depth interval at a measured depth of about 3500 meters indicates that at least one condition in the wellbore has changed between T1 and T2 that causes the discontinuity. At T3, the additional discontinuity at 3500 meters becomes more pronounced.

Figure 11:
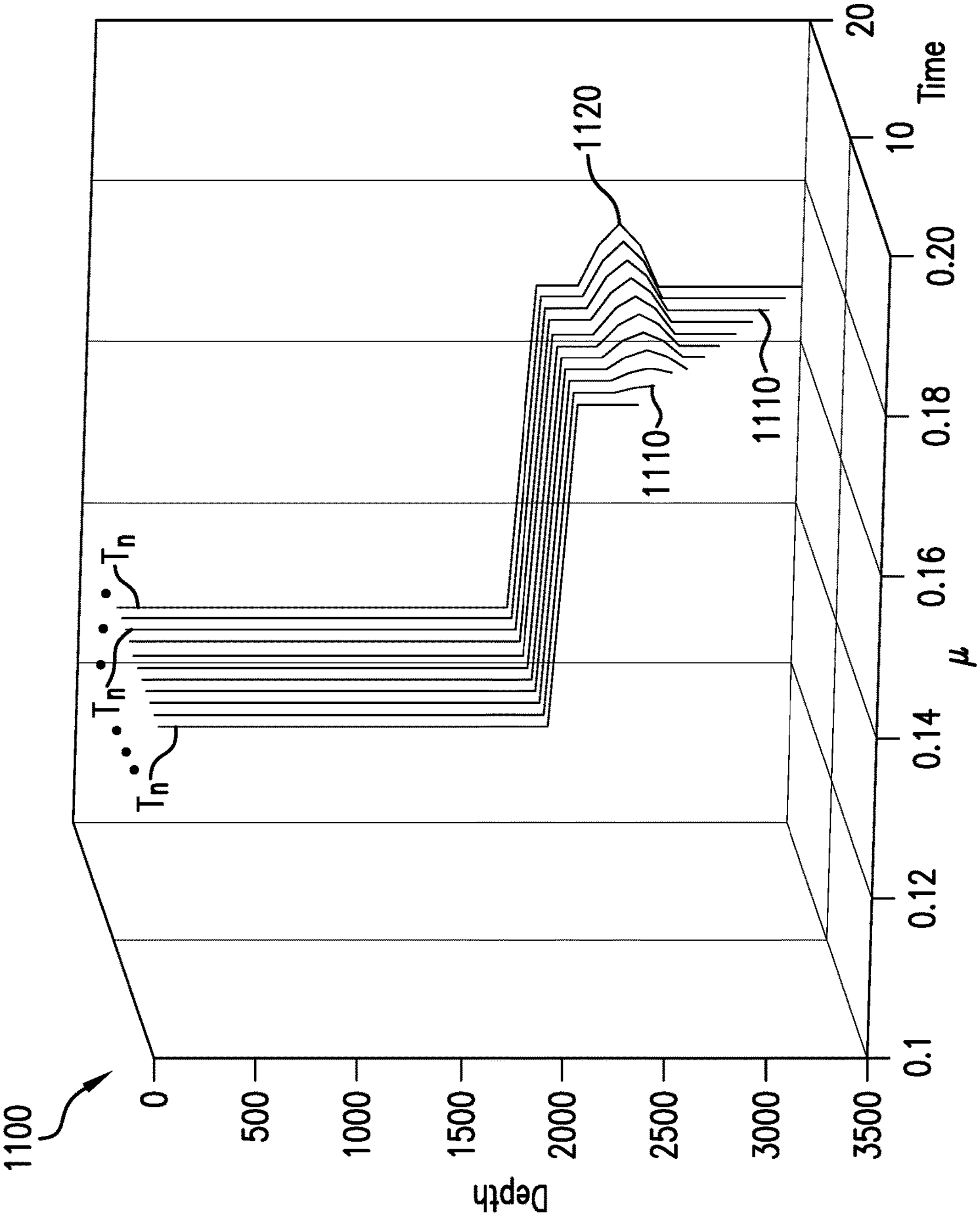
FIG. 11 shows a three-dimensional graph of an exemplary change of a friction parameter at a plurality of depths over time.

FIG. 11 shows a three-dimensional graph 1100 of an exemplary change of a friction parameter (e.g., $\mu_{dyn}$, $\mu_{stat}$, $\mu_{stat,t\rightarrow infinity}$) vs. depth (e.g., measured depth) at a plurality of friction test times. The methods disclosed herein thereby enable the identification of a friction condition using a plurality of friction tests performed at a plurality of times T1, . . . , T11 (indicated by placeholder Tn) and enable the localization of potential trouble zones through the detection of trends in a friction parameter over time at selected depths along the wellbore. In the illustrative graph of FIG. 11, eleven friction tests are performed at bit depths 1110 between 2200 m and 3400 m over a selected time period from T1 to T11. Each line in FIG. 11 represents the results of a single friction test. Each line in FIG. 11 has its individual end point representing the respective bit depth 1110 at the time of the respective friction test. For the first friction test at time T1, the friction parameter μ is constant from 0 to 2000 m (casing/liner) and increases in the open hole section (depth>2000 m). However, the results of the friction tests display a trend 1120 at depth 2500 meters in which the friction parameter p grows over time, indicating the development of a stuck pipe condition. Hence, monitoring and analysis of trend 1120 can be used to identify potential trouble zones, such as a zone with developing stuck pipe condition at a time that allows counteracting the stuck pipe condition in response to the measured friction parameters. Zones of higher friction or zones with an identified trend 1120 can be confirmed by additional data that will be acquired downhole including, but not limited, to magnetic or gravity measurements (including rotational azimuth and near-bit inclination) or measurements of the local bending moment to identify zones of higher dog-leg severity or curvature of the wellbore, caliper data or image data (e.g. resistivity, porosity, density, or gamma images) to identify over gauged (e.g. breakouts) or under gauged hole regions that may correspond to zones of relatively high or low friction. Counteracting the development of stuck pipe conditions may include one or more of alerting an operator (e.g. with a communication device located downhole and/or at the earth's surface), hole cleaning (e.g., flushing fluid between the wellbore 104 and the string 102, such as by applying a pumping sweep with a pump located downhole or at the earth's surface), reaming with a reaming bit at least a portion of the wellbore 104, reciprocating pipe (i.e. moving, with the axial force device 112—such as a winch, a crane or the traveler block—the drill string up and down in an axial direction to remove any ledge, cuttings or other obstruction in the wellbore), or increasing, with the rotary device, a rotational velocity of the string, for example in conjunction with cuttings concentration modeling at a time before the string 102 or one or more pipes of the string 102 become stuck.

Figure 12:
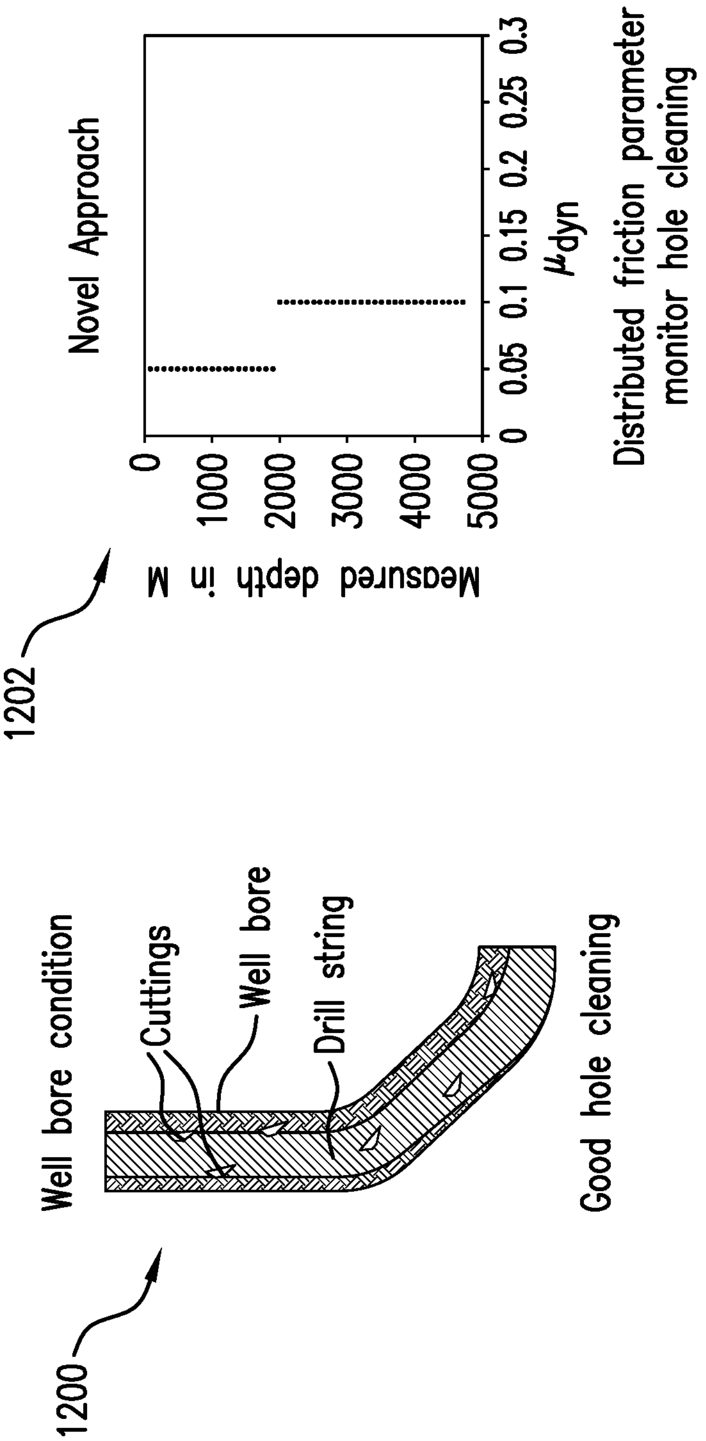
FIG. 12 shows a first wellbore condition in which cuttings flow through an annulus between the string and wellbore with efficient hole cleaning.
Figure 13:
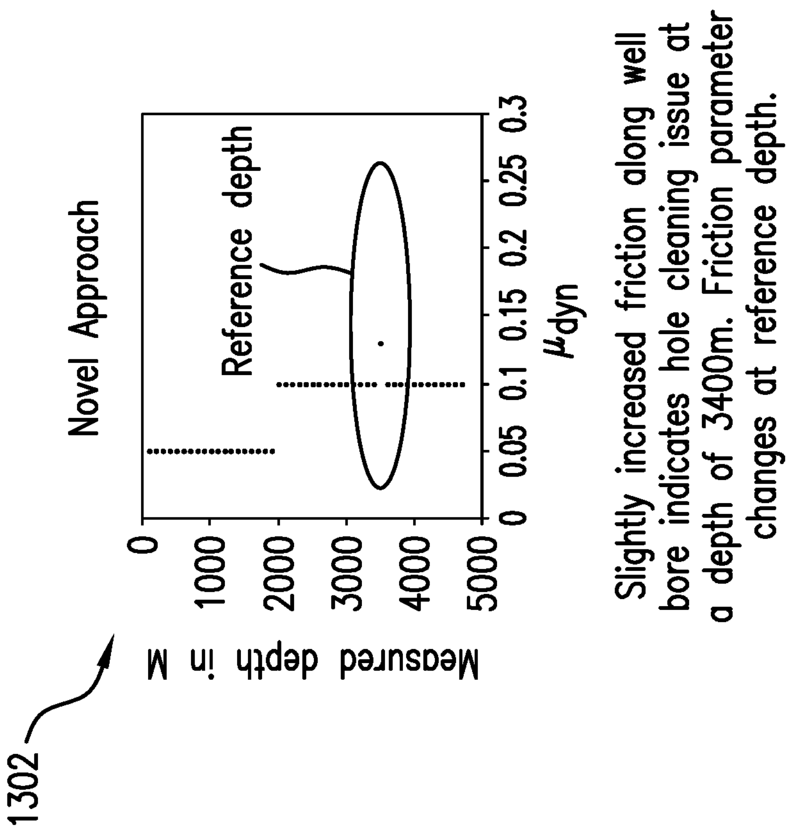
FIG. 13 shows a second wellbore condition in which cuttings are beginning to accumulate in the wellbore.
Figure 13:
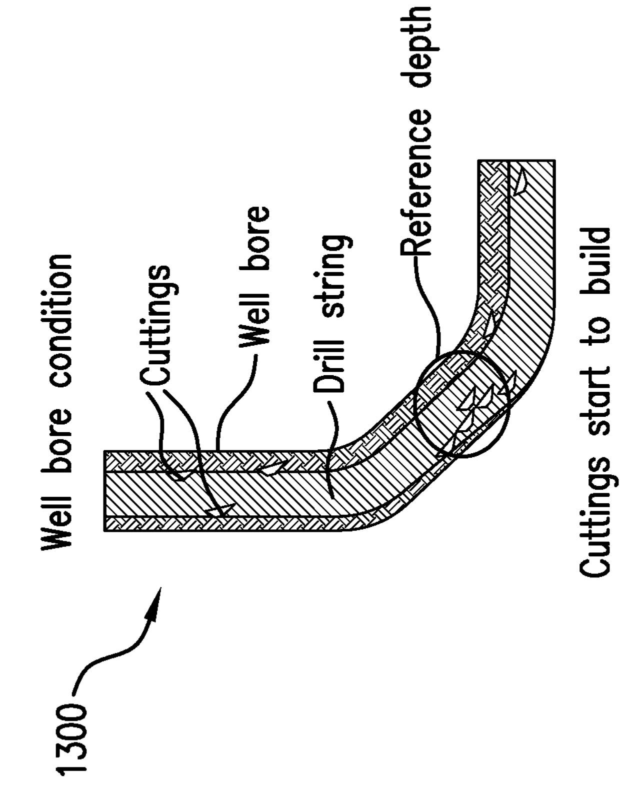
Figure 14:
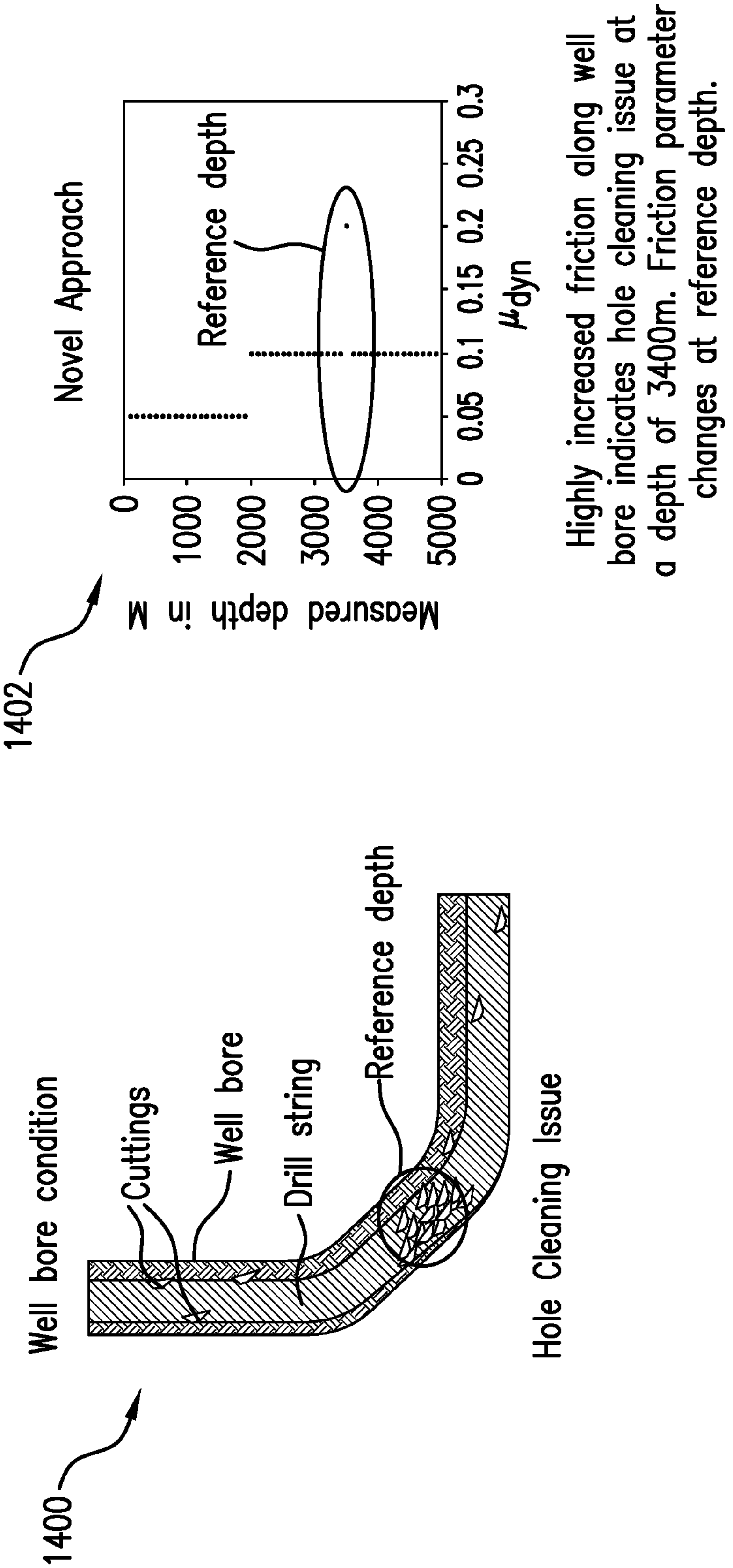
FIG. 14 shows a third wellbore condition in which the accumulation of cuttings is creating a sticking condition of the string in the wellbore.

FIGS. 12-14 illustrate a correlation of friction parameter with wellbore condition. The graphs 1202, 1302, and 1402, correspond to the graphs 1002 in FIG. 10. FIG. 12 shows a first wellbore condition 1200 in which cuttings flow through an annulus between the string and wellbore with efficient hole cleaning (i.e., little or no accumulation of cuttings in the wellbore). The corresponding graph 1202 of measured depth vs. coefficient of friction shows constant values of the dynamic friction parameter in both the cased/lined and uncased/unlined regions, with a discontinuity at the interface.

FIG. 13 shows a second wellbore condition 1300 in which cuttings are beginning to accumulate in the wellbore. The corresponding graph 1302 if measured depth vs. coefficient of friction shows a growing discontinuity in the dynamic friction parameter at the measured depth of the accumulation.

FIG. 14 shows a third wellbore condition 1400 in which the accumulation of cuttings is creating a sticking condition of the string in the wellbore. The corresponding measured depth vs. coefficient of dynamic friction graph 1402 shows a large discontinuity in the friction parameter at the measured depth of the sticking point.

Figure 15:
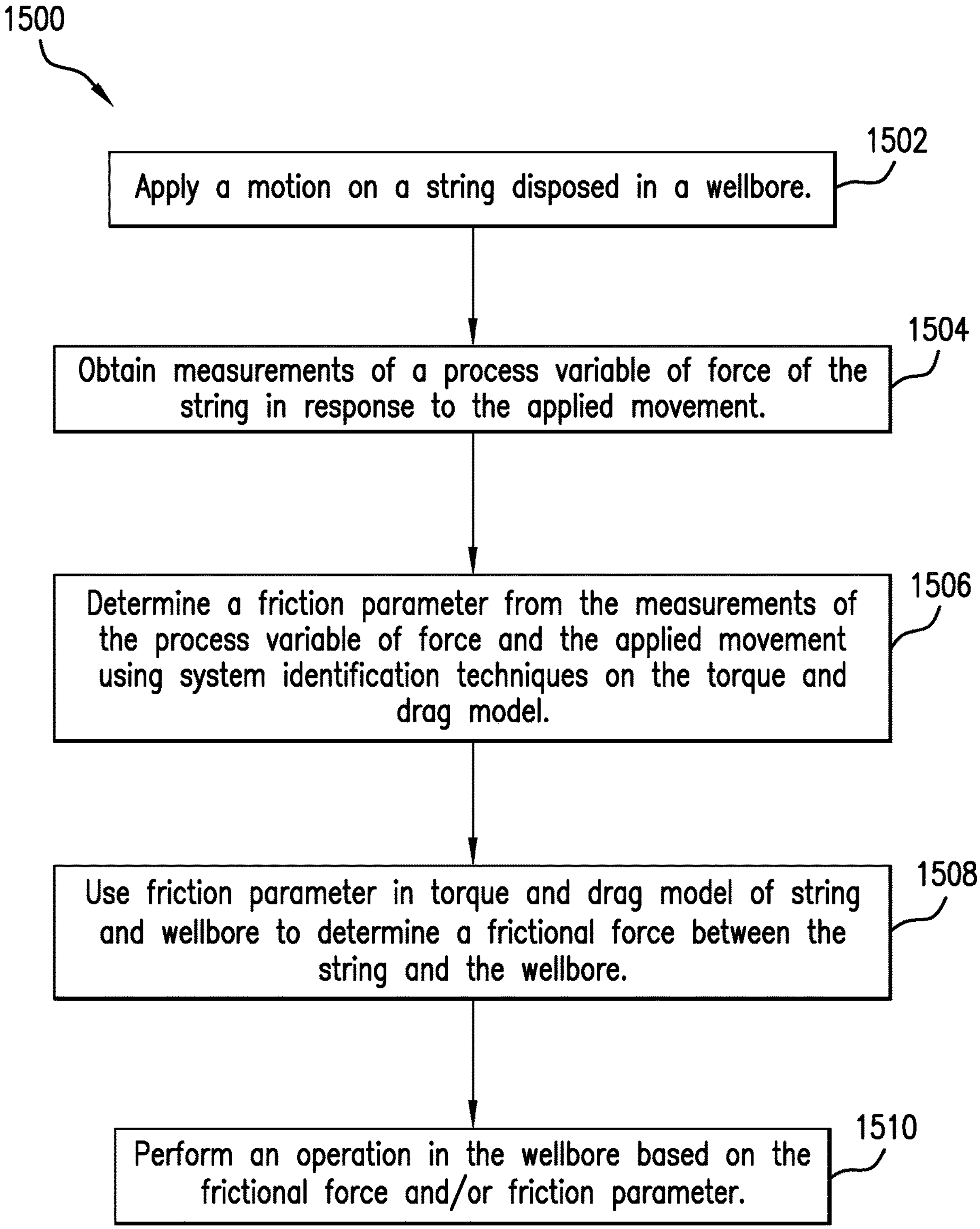
FIG. 15 shows a block diagram illustrating a method of determining a frictional force in a wellbore.

FIG. 15 shows a block diagram 1500 illustrating a method of performing an operation in a wellbore. In box 1502, a displacement of a string is applied to at least a portion of the string over a selected time period. For example, a block movement is applied to a string disposed in a wellbore. The movement can be an axial movement (block position movement), a rotational movement (surface rotary speed) or combination thereof. In box 1504, measurements are obtained of a dynamic process variable of the string in conjunction with the applied movement. The dynamic process variable can be axial dynamic data (e.g., axial force or load, such as hookload, or acceleration) or rotational dynamic data (e.g., rotational moment, such as torque, or rotational acceleration) or a combination thereof. Boxes 1502 and 1504 together correspond to a friction test (e.g., the friction test that is described with respect to FIGS. 2 and 3). Those skilled in the art will understand that boxes 1502 and 1504 are interchangeable: instead of measuring data in response an applied movement, it is also possible to measure displacement data in response to an applied process variable, such as force etc. That is, the movement of the string occurs in conjunction with the applied process variable and vice versa. In box 1506, one or more friction parameters are determined from the measurements of the dynamic process variable and the applied movement using system identification techniques on the torque and drag model. In aspects, from the measurements of the dynamic process variable and the applied movement, the one or more friction parameters can be derived at multiple depths, where the friction parameters at the multiple depths are valid for the same time at which the friction test (box 1502, 1504) is executed. In box 1508, the friction parameter is used in a model of the string and wellbore to determine a frictional force between the string and the wellbore. To determine the frictional force the output equation of the torque and drag model is adapted to output all frictional forces along the string, which are of interest (compared to only output the dynamic process variable for the system identification). Depending on the system identification method the boxes 1506 and 1508 are performed within one step (e.g., using a Kalman Filter, such as an extended or unscented Kalman Filter). In box 1510, an operation is performed in the wellbore based on the frictional force and/or the friction parameter. This may include using anomaly detection (e.g., trend identification) of the frictional force and/or the frictional parameter over the course of the string and/or over the course of the time (e.g., development of the frictional force over the last 3 hours or development of the frictional force over the time that is required to drill ten drill pipes or even twenty drill pipes to identify potential sticking points, for example). In various embodiments, the operation can include remedial actions that can be applied at the location of the sticking points where the incident occurs. Such remedial actions can include outreaming at one or more certain positions, for example at locations where trend analysis indicates potential trouble zones or sticking points.

Figure 16:
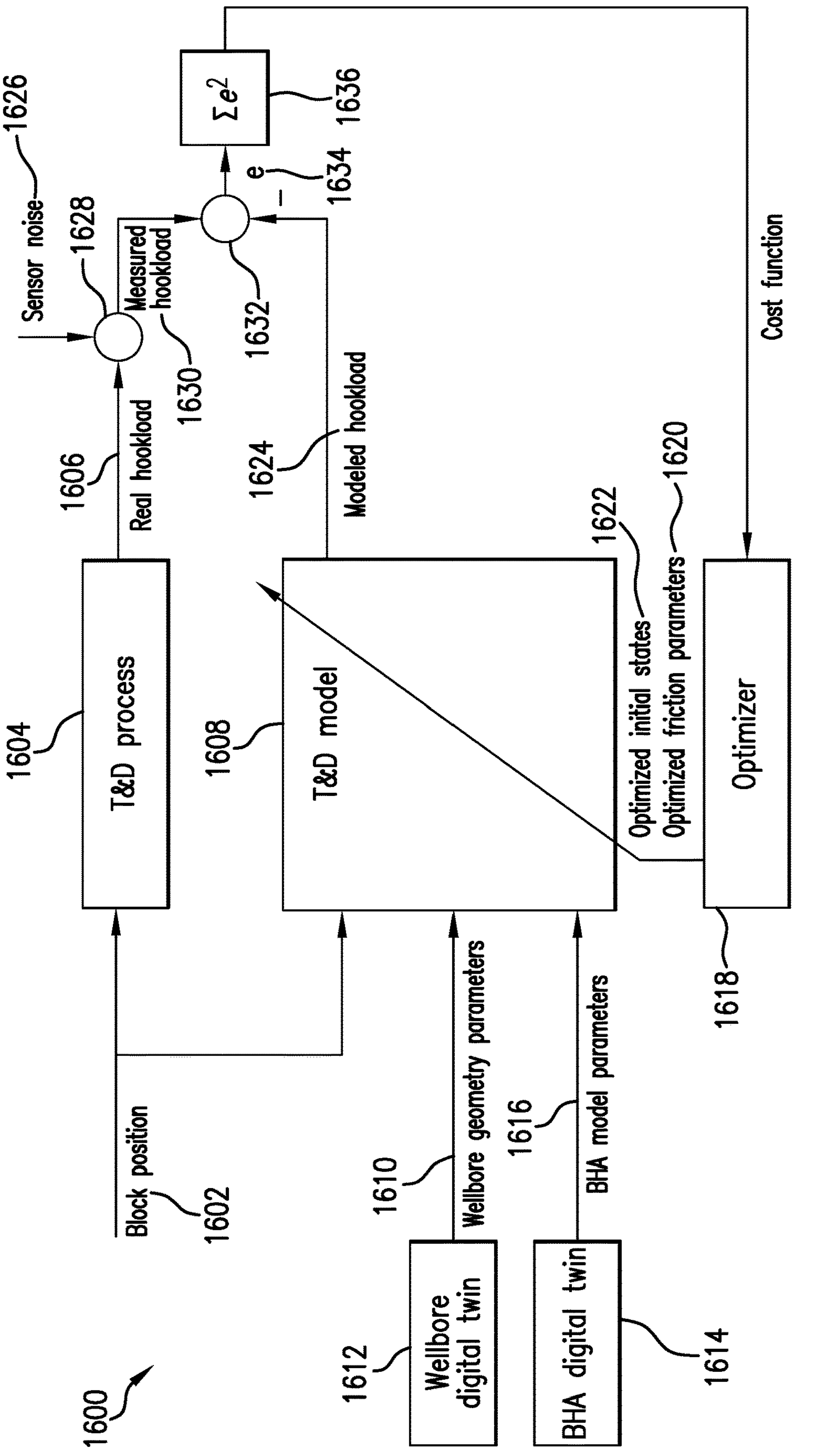
FIG. 16 shows a block diagram illustrating an optimization process for refining a string model based on various measurements obtained at the string.

FIG. 16 shows a block diagram 1600 illustrating a system identification process for determining friction parameters for more than one subregion or length interval of a string based on various measurements obtained at the string and/or at the surface. The process can be performed at processor 132 of the control unit 130 or at a downhole location, such as within string 102, in various embodiments. In the course of a friction test, such as the friction test described with respect to FIGS. 2 and 3, an excitation signal (e.g., triangle signal, see graph segments 202, 204, 206 and 208 in FIG. 2) is applied on a selected position of a string, such as block position 1602 and dynamic data (e.g., hookload 1606) will be measured in conjunction with the excitation signal. While FIG. 16 shows block position 1602 and hookload 1606 as displacement data and dynamic data, respectively, this is not to be understood as a limitation. Any type of displacement data may be used for the excitation signal, such as but not limited to, axial displacement data (e.g., axial displacement or axial velocity of a selected point on the string, such as block position of block speed) or rotational displacement data (e.g., rotational displacement or rotational velocity of the string). Similarly, any type of dynamic data that may occur in conjunction with the displacement data may be measured, such as axial dynamic data (e.g., axial force or load, such as hookload, or acceleration) or rotational dynamic data (e.g., rotational moment, such as torque, or rotational acceleration)). In addition, displacement data and dynamic data may be interchangeable for FIG. 16, so that dynamic data (e.g., hookload 1606) may be applied to the string and displacement data (e.g., block position 1602) occurring in conjunction with the dynamic data may be measured. Dynamic data and displacement data are related by the wellbore system, so that by applying one of the dynamic data and the displacement data will cause the torque and drag (T&D) process within the wellbore system to react with the other of the dynamic data and the displacement data. The hookload sensor that is used to sense the hookload 1606 will also add some noise 1626 to the sensed hookload 1606 (indicated by circle 1628) to output a measured hookload 1630. Typically, the displacement of the selected position on the string is relatively small, i.e., smaller than three or two pipes (usually called a stand, for example smaller than 30 meters or 20 meters) or even smaller than a single pipe (for example smaller than ten meters). Keeping the displacement of the selected position on the string relatively small, helps to save time that would be needed to screw and unscrew pipes if the displacement of the selected position on the string would be larger. A T&D model 1608 gets the same excitation signal (block position 1602) as input. In the T&D model, the string is divided in two or more subregions having corresponding length intervals with each subregion having a friction parameter. The two or more subregions may be of different lengths or may have the same length. The length intervals may be 1000 m or smaller, for example 500 m or smaller. The smaller the length intervals are, the more detailed are the derived friction parameters. On the other hand, the smaller the length intervals are, the more length intervals are needed and consequently the more data needs to be provided by the friction test (FIGS. 2, 3) to allow solution for friction parameter of all length intervals. However, a typical friction test allows length intervals of 300 m or smaller, or even 100 m or smaller such as 30 m or smaller. The subregions may correspond to components of the string, like pipes or subcomponents of the BHA. Friction parameters in different subregions may be equal or different. Additionally, wellbore geometry parameters 1610 (e.g., inclination, azimuth, and position) over the course of depth (e.g., the measured depths) are provided by a wellbore digital twin 1612 which is a data repository that may include wellbore related data and models. The wellbore digital twin 1612 can be based on the planned trajectory or can be updated while drilling to also include deviations from the planned trajectory like local doglegs. A BHA digital twin 1614 is a data repository that may include BHA and string related data and models and provides BHA and string model parameters 1616 for each subregion of the string. BHA and string model parameters 1616 may include, but are not limited to stiffness, geometry, density, and other properties describing the string and the BHA. In one embodiment, the BHA and string model parameters 1616 and the wellbore geometry parameters 1610 are constant over the course of an excitation signal (excitation period). In another embodiment, one or more of the BHA and string model parameters 1616 and/or the wellbore geometry parameters 1610 may vary over the course of an excitation signal. The T&D model first assumes initial states (e.g., position, velocity, acceleration, axial force over the course of the string) and friction parameters for the subregions of the string. For the calculation of the T&D model 1608, the friction parameters 1620 may be assumed to be constant over the course of the excitation signal. Based on these assumptions and the inputs from measurements of block position 1602, wellbore geometry parameters 1610, and BI-IA/string model parameters, the T&D model 1608 outputs a modeled hookload 1624. It is important to note, that the T&D model 1608 is capable of determining dynamic hookload in the time domain including transient effects. This is required to model friction tests like those described with respect to FIGS. 2 and 3. A T&D model that is not capable of modelling transient effects, for example, would not be able to model the complete data acquired during a friction test but would only allow determining of the static hookload (e.g., during a pickup phase). An error or difference e 1634 between the modeled hookload 1624 and the measured hookload 1630 is determined at a subtractor 1632. The error or difference e 1634 is a basis for a cost function 1636. Cost function 1636 may comprise a sum of squares of errors/differences between the measured hookload 1630 and the modeled hookload 1624 for each subregion, in an embodiment. The optimizer 1618 adapts or updates the subregions to generate optimized subregions (e.g., subregions with optimized length intervals), the friction parameters to generate optimized friction parameters 1620 and the initial states to generate optimized initial states 1622 in order to re-calculate the modeled hookload 1624 and to reduce or optimize the cost function 1636. In other words, the optimizer 1618 refines the T&D model parameter in order to have a model that better represents the mechanics of the string in the wellbore and outputs a modeled hookload 1624 that better matches the measured hookload 1630. The process is based on the data of the excitation period. The optimization can be a least squares approach, an iterative approach, a kind of Kalman Filter or any other optimization approach. With the modeled hookload 1624 and the measured hookload 1630, the cost function 1636 will be recalculated. If the cost function is below a pre-selected threshold, the T&D model 1608 will output the optimized friction parameters 1620 for each subregion. If the cost function is above the pre-selected threshold, the optimizer 1618 will again generate optimized initial states 1622 and optimized friction parameters 1620 to re-calculate the cost function 1636 and will repeat this process until the cost function 1636 is below the pre-selected threshold and the T&D model 1608 outputs the optimized friction parameters 1620 for each subregion of the string. In another embodiment, the T&D model additionally outputs axial force measurements and/or axial accelerations or velocities at further locations of the string. In another embodiment, the shown axial system identification process is applied at the torsional system by using 'rotary angle'/'rotary displacement', or surface rotary speed instead of block position and real/modeled/measured surface torque instead of hookload. In another embodiment, the system is a combination of the axial and the torsional system.

The methods disclosed herein therefore enable for mechanical and hydraulic wellbore conditions to be detected and localized more reliably and at an earlier stage of drilling. Consequently, the risk of having stuck pipe issues is reduced.

Set forth below are some embodiments of the foregoing disclosure:

Embodiment 1: A method of performing an operation in a wellbore penetrating the earth's formation. The method includes disposing a string in the wellbore, selecting a first subregion of the string and a second subregion of the string, determining, by a first friction test at a first friction test time, a first friction parameter between the first subregion and the wellbore and a second friction parameter between the second subregion and the wellbore, and performing the operation based on the first friction parameter and the second friction parameter.

Embodiment 2: The method of any prior embodiment, wherein the first friction test includes moving at least a portion of the string, sensing displacement data and dynamic data in conjunction with a movement, and determining the first friction parameter and the second friction parameter based on the displacement data and the dynamic data.

Embodiment 3: The method of any prior embodiment, wherein the string includes a plurality of pipes, and wherein the movement of at least the portion of the string includes an axial movement that is smaller than a length of three pipes.

Embodiment 4: The method of any prior embodiment, wherein the string including a plurality of pipes, further including: adding a first pipe to the string or removing the first pipe from the string, and determining, by a second friction test at a second friction test time after adding or removing the first pipe to or from the string, a third friction parameter between the first subregion and the wellbore and a fourth friction parameter between the second subregion and the wellbore; wherein before adding or removing the first pipe, the second subregion is at least partially and temporarily within the same measured depth interval of the wellbore as the first subregion after adding or removing the first pipe.

Embodiment 5: The method of any prior embodiment, wherein a trend is detected based on the second friction parameter and the third friction parameter.

Embodiment 6: The method of any prior embodiment, wherein the displacement data includes at least one of (i) axial displacement or axial velocity of a selected point on the string, and (ii) rotational displacement or rotational velocity of the string, and wherein the dynamic data includes at least one of (i) a selection from axial force, axial load, and axial acceleration and (ii) a selection from torque and rotational acceleration.

Embodiment 7: The method of any prior embodiment, wherein the first friction parameter and the second friction parameter is determined by using a torque and drag model that is configured to model transient displacement data or transient dynamic data.

Embodiment 8: The method of any prior embodiment, wherein a length of the first subregion and the length of the second subregion is less than 300 m.

Embodiment 9: The method of any prior embodiment, further including determining a measured depth interval in the wellbore of a sticking point or a potential sticking point between the string and the wellbore based on the first friction parameter and the second friction parameter.

Embodiment 10: The method of any prior embodiment, wherein performing the operation includes performing at least one of: (i) providing confirmation measurements with downhole sensors; (ii) alerting an operator; (iii) cleaning at least a portion of the wellbore; (iv) reaming at least a portion of the wellbore; (v) executing a pumping sweep; (vi) executing a reciprocating pipe; (vii) increasing rotational velocity of the string; and (viii) modeling cuttings concentration in the wellbore.

Embodiment 11: An apparatus for performing an operation in a wellbore penetrating the earth's formation. The apparatus includes a string disposed in the wellbore; and a first processor configured to: determine, by a first friction test at a first friction test time, a first friction parameter between a first selected subregion and the wellbore and a second friction parameter between a second selected subregion and the wellbore.

Embodiment 12: The apparatus of any prior embodiment, wherein the first friction test comprises moving at least a portion of the string, sensing displacement data and dynamic data in conjunction with a movement, and determining the first friction parameter and the second friction parameter based on the displacement data and the dynamic data.

Embodiment 13: The apparatus of any prior embodiment, wherein the string comprises a plurality of pipes, and wherein the movement of at least the portion of the string comprises an axial movement that is smaller than a length of three pipes.

Embodiment 14: The apparatus of any prior embodiment, wherein the string comprises a plurality of pipes, wherein the first processor is further configured to determine, by a second friction test at a second friction test time after adding or removing a first pipe to or from the string, a third friction parameter between the first selected subregion and the wellbore and a fourth friction parameter between the second selected subregion and the wellbore; wherein before adding or removing the first pipe, the second selected subregion is at least partially and temporarily within the same measured depth interval of the wellbore as the first selected subregion after adding or removing the first pipe.

Embodiment 15: The apparatus of any prior embodiment, wherein the first processor is further configured to detect a trend based on the second friction parameter and the third friction parameter.

Embodiment 16: The apparatus of any prior embodiment, wherein the displacement data comprises at least one of (i) axial displacement or axial velocity of a selected point on the string, and (ii) rotational displacement or rotational velocity of the string, and wherein the dynamic data comprises at least one of (i) a selection from axial force, axial load, and axial acceleration and (ii) a selection from torque and rotational acceleration.

Embodiment 17: The apparatus of any prior embodiment, wherein the processor is further configured to determine the first friction parameter and the second friction parameter by using a torque and drag model that models at least one of transient displacement data and transient dynamic data.

Embodiment 18: The apparatus of any prior embodiment, wherein a length of the first selected subregion and the length of the second selected subregion is less than 300 m.

Embodiment 19: The apparatus of any prior embodiment, wherein the processor is further configured to determine a measured depth interval in the wellbore of a sticking point or a potential sticking point between the string and the wellbore based on the first friction parameter and the second friction parameter.

Embodiment 20: The apparatus of any prior embodiment, wherein the string comprises at least one of: (i) one or more downhole sensors configured to provide confirmation measurements in response to determining the first friction parameter and the second friction parameter; (ii) a communication device configured to alert an operator in response to determining the first friction parameter and the second friction parameter; (iii) a pump configured to clean at least a portion of the wellbore in response to determining the first friction parameter and the second friction parameter; (iv) a reamer bit configured to ream at least a portion of the wellbore in response to determining the first friction parameter and the second friction parameter; (v) a second processor configured to execute a pumping sweep in response to determining the first friction parameter and the second friction parameter; (vi) an axial force device configured to execute a reciprocating pipe in response to determining the first friction parameter and the second friction parameter; (vii) a rotary device configured to vary rotational velocity of the string in response to determining the first friction parameter and the second friction parameter; and (viii) a third processor configured to model cuttings concentration in the wellbore in response to determining the first friction parameter and the second friction parameter.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of performing an operation in a wellbore penetrating the earth's formation, the method comprising:
- disposing a string in the wellbore;
- selecting a first subregion of the string and a second subregion of the string;
- placing the first subregion of the string at a measured depth interval of the wellbore;
- performing a first friction test at a first friction test time by moving the string to move the first subregion with respect to the measured depth interval and measuring a first displacement data and a first dynamic data during the first friction test;
- determining a first friction parameter between the first subregion of the string and the measured depth interval of the wellbore from the first displacement data and the first dynamic data;
- moving the string so that the second subregion of the string is at least partially or temporarily within the measured depth interval;
- performing a second friction test at a second friction test time by moving the string to move the second subregion with respect to the measured depth interval and measuring a second displacement data and a second dynamic data during the second friction test;
- determining a second friction parameter between the second subregion of the string and the measured depth interval of the wellbore from the second displacement data and the second dynamic data; and
- performing the operation based on the first friction parameter and the second friction parameter.

2. The method of claim 1, wherein the string comprises a plurality of pipes, and wherein the movement of the string comprises an axial movement that is smaller than a length of three pipes of the plurality of pipes.

3. The method of claim 1, wherein the string comprises a plurality of pipes, the method further comprising:
- moving the string by at least one of: (i) adding a first pipe to the string; and (ii) removing the first pipe from the string.

4. The method of claim 1, further comprising detecting a trend based on the first friction parameter and the second friction parameter, identifying a development of a stuck pipe condition from the trend, and performing the operation to counteract the stuck pipe condition.

5. The method of claim 1, wherein the first or second displacement data comprises at least one of (i) axial displacement or axial velocity of a selected point on the string, and (ii) rotational displacement or rotational velocity of the string, and wherein the first or second dynamic data comprises at least one of (i) a selection from axial force, axial load, and axial acceleration and (ii) a selection from torque and rotational acceleration.

6. The method of claim 1, further comprising using a torque and drag model to model transient displacement data or transient dynamic data to determine the first friction parameter and the second friction parameter.

7. The method of claim 1, further comprising determining a sticking point or a potential sticking point between the string and the wellbore based on the first friction parameter and the second friction parameter and performing the operation to counteract a stuck pipe condition.

8. The method of claim 1, wherein performing the operation comprises performing at least one of: (i) cleaning at least a portion of the wellbore; (ii) reaming at least the portion of the wellbore; (iii) executing a pumping sweep; (iv) executing a reciprocating pipe; and (v) increasing rotational velocity of the string.

9. An apparatus for performing an operation in a wellbore penetrating the earth's formation, the apparatus comprising:
- a string disposed in the wellbore; and
- a first processor configured to:
  - place a first subregion of the string at a measured depth interval of the wellbore;
  - perform a first friction test at a first friction test time by moving the string to move the first subregion with respect to the measured depth interval and measuring a first displacement data and a first dynamic data during the first friction test;
  - determine a first friction parameter between the first subregion of the string and the measured depth interval of the wellbore from the first displacement data and the first dynamic data;
  - move the string so that a second subregion of the string is at least partially or temporarily within the measured depth interval;
  - perform a second friction test at a second friction test time by moving the string to move the second subregion with respect to the measured depth interval and measuring a second displacement data and a second dynamic data during the second friction test;
  - determine a second friction parameter between the second subregion of the string and the measured depth interval of the wellbore from the second displacement data and the second dynamic data; and
  - perform the operation based on the first friction parameter and the second friction parameter.

10. The apparatus of claim 9, wherein the string comprises a plurality of pipes, and wherein the movement of the string comprises an axial movement that is smaller than a length of three pipes of the plurality of pipes.

11. The apparatus of claim 9, wherein the string comprises a plurality of pipes, wherein the first processor is further configured to move the string by at least one of: (i) adding a first pipe to the string; and (ii) removing the first pipe from the string.

12. The apparatus of claim 9, wherein the first processor is further configured to detect a trend based on the first friction parameter and the second friction parameter, identify a development of a stuck pipe condition from the trend, and perform the operation to counteract the stuck pipe condition.

13. The apparatus of claim 9, wherein the first or second displacement data comprises at least one of (i) axial displacement or axial velocity of a selected point on the string, and (ii) rotational displacement or rotational velocity of the string, and wherein the first or second dynamic data comprises at least one of (i) a selection from axial force, axial load, and axial acceleration and (ii) a selection from torque and rotational acceleration.

14. The apparatus of claim 9, wherein the first processor is further configured to use a torque and drag model that models at least one of transient displacement data and transient dynamic data to determine the first friction parameter and the second friction parameter.

15. The apparatus of claim 9, wherein the first processor is further configured to determine a sticking point or a potential sticking point between the string and the wellbore based on the first friction parameter and the second friction parameter and perform the operation to counteract a stuck pipe condition.

16. The apparatus of claim 9, wherein the string comprises at least one of: (i) one or more downhole sensors configured to provide confirmation measurements in response to determining the first friction parameter and the second friction parameter; (ii) a communication device configured to alert an operator in response to determining the first friction parameter and the second friction parameter; (iii) a pump configured to clean at least a portion of the wellbore in response to determining the first friction parameter and the second friction parameter; (iv) a reamer bit configured to ream at least the portion of the wellbore in response to determining the first friction parameter and the second friction parameter; (v) a second processor configured to execute a pumping sweep in response to determining the first friction parameter and the second friction parameter; (vi) an axial force device configured to execute a reciprocating pipe in response to determining the first friction parameter and the second friction parameter; (vii) a rotary device configured to vary rotational velocity of the string in response to determining the first friction parameter and the second friction parameter; and (viii) a third processor configured to model cuttings concentration in the wellbore in response to determining the first friction parameter and the second friction parameter.

* * * * *